No. 664,353. Patented Dec. 18, 1900.
J. C. RIEGER.
BICYCLE SUPPORT.
(Application filed Apr. 23, 1900.)
(No Model.)
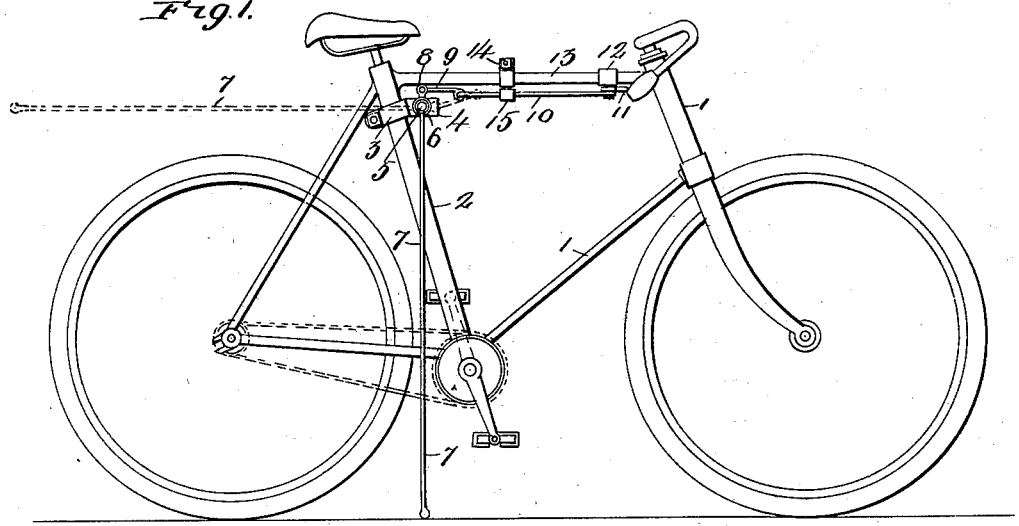
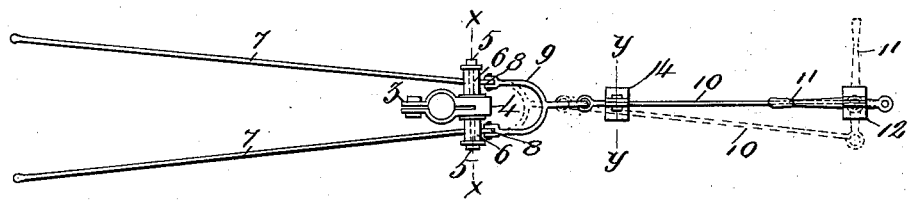
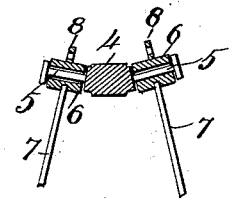
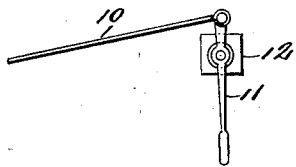
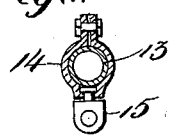
WITNESSES:
D. J. Anderson
V. M. Bethe
INVENTOR
John C. Rieger
BY
Halbert & Halbert
ATTORNEYS

UNITED STATES PATENT OFFICE.

JOHN C. RIEGER, OF PINCKNEYVILLE, ILLINOIS.

BICYCLE-SUPPORT.

SPECIFICATION forming part of Letters Patent No. 664,353, dated December 18, 1900.

Application filed April 23, 1900. Serial No. 13,937. (No model.)

*To all whom it may concern:*

Be it known that I, JOHN C. RIEGER, a citizen of the United States, residing at Pinckneyville, in the county of Perry and State of Illinois, have invented new and useful Improvements in Bicycle-Supports, of which the following is a specification.

My invention relates to improvements in bicycle-supports; and it consists in the novel combination and arrangement of parts, as will be hereinafter more particularly described and claimed.

In the drawings, Figure 1 is a side elevation of my complete invention as applied to a bicycle. Fig. 2 is a top plan view of my complete invention. Fig. 3 is a transverse section in detail, taken on the line $x\,x$ of Fig. 2. Fig. 4 is a similar section taken on the line $y\,y$ of Fig. 2, and Fig. 5 is a plan view showing the operating-lever and rod connection.

The object of my invention is to construct a simple, practical, and durable support for bicycles which is adapted to hold said bicycle in an upright position before the same is mounted, the parts being so constructed and arranged as to enable the rider to elevate the support in such a manner as not only to clear itself from the ground, but place the same in such a position while the bicycle is in motion as not to interfere with the perfect freedom and movement of the bicycle, as well as the rider; and it consists in the details of the specific construction of the device employed, as will be hereinafter more specifically described in detail.

Referring to the drawings, 1 represents a bicycle of the usual or well-known construction, to which my invention is readily applied, and secured to the upright supporting member 2 of said bicycle, adjacent to the upper portion of the frame thereof, is a clip 3, having a solid extension 4, from the opposite sides of which project two short inclined-arranged spindles 5, upon which are mounted collars 6, to which are secured the upper ends of the supporting-legs 7, the lower ends of which are adapted to be brought in contact with the ground, by which arrangement the said supporting-legs are properly arranged at an incline, so as to clear the rear part of the bicycle when the same are elevated. Secured to said collars 6, on a line with the supporting-legs 7, are short bearings 8, to which the ends of the fork 9 are movably attached, and likewise secured to the medial portion of said fork is one end of a longitudinal rod 10, the opposite end being movably attached to the short arm of the operating-lever 11, the latter being movably secured intermediate of its ends to a clip 12, secured to the horizontal member 13 of the bicycle-frame, adjacent to the front fork or handles, forming a part thereof.

Adjustably secured to the horizontal member 13 of the frame of the bicycle is a clip 14, to the lower portion of which is movably attached a guide-bearing 15, through which the longitudinal rod 10 freely passes, whereby the latter is free to be operated in either direction for properly elevating or lowering the supporting-legs 7 of the support.

From the foregoing description it will be seen that when the operating-lever 11 is in the position as shown in dotted lines, Fig. 2, the supporting-legs 7 or lower ends of the same will be in contact with the ground and operate to properly hold the bicycle in a perpendicular position, and when it is desired to elevate the said legs the said operating-lever 11 is turned in position, as shown in full lines in Fig. 2, whereby the parts will assume their normal position and remain in said position until the operating-lever is again turned in a transverse position in respect to the bicycle.

Having fully described my invention, what I claim is—

A bicycle-support, comprising a clip adapted to be secured to the frame of the bicycle, a solid extension forming a part of the same, spindles forming a part of said extension and arranged at an incline, collars movable upon said spindles, supporting-legs projecting from said collars and arranged in an inclined position in respect to one another, bearings also secured to said collars, a fork, the ends of which are movably secured to said bearings, a longitudinal rod, one end of which is movably secured to the medial portion of said fork, a clip secured to the upper horizontal member of the bicycle-frame, an operating-lever movably secured to said clip about its medial portion, to the short arm of which is attached the opposite end of said longitudinal rod, a clip adjustably secured to said upper horizontal member of the frame, and a guide-bearing movably secured to the same, through which the said longitudinal rod loosely passes, as and for the purpose described.

In testimony whereof I affix my signature in presence of two witnesses.

JOHN C. RIEGER.

Witnesses:
 JAS. H. TROVER,
 J. G. TAFFEE.